US011713270B2

(12) United States Patent
Tu (10) Patent No.: US 11,713,270 B2
(45) Date of Patent: Aug. 1, 2023

(54) ENERGY-SAVING WIND BOX, COOLING DEVICE AND ENERGY-SAVING COOLING SYSTEM

(71) Applicant: TUNG CHANG MACHINERY AND ENGINEERING CO., LTD., Taoyuan (TW)

(72) Inventor: Li-Jen Tu, Taoyuan (TW)

(73) Assignee: Tung Chang Machinery and Engineering Co., Ltd., Taoyuan (TW)

( * ) Notice: Subject to any disclaimer, the term of this patent is extended or adjusted under 35 U.S.C. 154(b) by 231 days.

(21) Appl. No.: 17/140,315

(22) Filed: Jan. 4, 2021

(65) Prior Publication Data

US 2022/0212977 A1    Jul. 7, 2022

(51) Int. Cl.
C03B 27/04    (2006.01)

(52) U.S. Cl.
CPC ...... *C03B 27/0404* (2013.01); *C03B 27/0417* (2013.01)

(58) Field of Classification Search
None
See application file for complete search history.

(56) References Cited

U.S. PATENT DOCUMENTS

| 2020/0131070 A1 | 4/2020 | Lyytikäinen et al. |
| 2020/0369550 A1 | 11/2020 | Zhao |

FOREIGN PATENT DOCUMENTS

| CN | 203128411 U | 8/2013 |
| CN | 203346265 U | 12/2013 |
| CN | 203639327 U | 6/2014 |
| CN | 210528777 U | 5/2020 |
| JP | S61-270230 A | 11/1986 |
| TW | M610817 U | 4/2021 |

OTHER PUBLICATIONS

CN 202322618 machine translation, Zhao et al. A cooling box on tempering machine, Jul. 2012 (Year: 2012).*
JP 07-267664 machine translation, Hirai et al., Method for controlling temperature and pressure blown fluid flow in production of tempered glass, 1995 (Year: 1995).*
Combined Search and Examination Report for corresponding British Application No. GB2100023.7, dated Jul. 13, 2021.
Extended Search Report for corresponding European Application No. 21151192.8, dated Jun. 9, 2021.
Communication From Taiwan Patent Office Regarding a Corresponding Foreign Application Dated (Taiwan Year 111) dated Mar. 2, 2022.

* cited by examiner

*Primary Examiner* — Queenie S Dehghan
(74) *Attorney, Agent, or Firm* — Rosenberg, Klein & Lee (57) ABSTRACT

The present disclosure illustrates an energy-saving wind box, a cooling device and an energy-saving cooling system. A wind box body of the present disclosure is installed with slot plates and driving components to movably shield wind holes, wherein an outer surface of the wind box body has air outlets arranged horizontally in an upper row and a lower row, and the air outlets in the upper row are respectively opposite to the air outlets in the lower row. Each air outlet has a wind hole. The slot plates are respectively disposed in the wind holes. Each driving component is connected to two corresponding slot plates in the upper and lower rows which are arranged opposite to each other. The two slot plates are controlled by the driving component to pivot to close or open the corresponding two wind holes.

7 Claims, 11 Drawing Sheets

ENERGY-SAVING WIND BOX, COOLING DEVICE AND ENERGY-SAVING COOLING SYSTEM

BACKGROUND

Technical Field

The present disclosure relates to a glass cooling processing technology, in particular to an energy-saving wind box, a cooling device and an energy-saving cooling system that can adjust the wind output region according to a size and a position of the glass and correspondingly regulate an output wind power which corresponds to a rotating speed of a motor.

Related Art

Glass has excellent penetration rate and scratch resistance, so it is widely used in daily life. At present, related glass products can be seen not only in buildings and general daily necessities, but also in electronic appliances and vehicles. It can be seen that the peripheral products of glass have flooded people's lives.

Glass is mostly made through batching, melting, forming, annealing and other processes. After the glass is made, further processing can be performed to improve the functionality of the glass. For example, the annealed glass can be cut to the required size, then the glass is heated by a glass heating furnace to soften the glass, and then the glass is rapidly cooled down by a cooling device, so the temperature of the glass surface is decreased below the annealing temperature for rapid hardening and shrinking. When the inside of the glass shrinks, it will cause a compressive stress on the surface, and the inside of the glass will have a tensile stress, which can increase the strength of the glass to form a so-called strengthened glass.

Generally speaking, the aforementioned cooling device at least includes components, such as, a motor, a wind box, and a plurality of wind outlet structures. The wind box includes air outlets arranged horizontally in an upper row and a lower row on the surface of the wind box, and each of the wind outlet structures is connected to the corresponding air outlets. Between the wind outlet structures arranged in the upper and lower rows, rollers are installed and used to carry the glass. When the motor of the cooling device operates, wind can be generated. The wind can then be passed through the wind outlet structure and blown to the glass on the rollers, so that the glass can be cooled down.

The size of the glass to be performed for the cooling process is different each time, but the conventional cooling device can only output the wind in the whole wind output region every time when it is started. The conventional cooling device and cannot adjust the wind output region according to the glass size and cannot correspondingly adjust the rotating speed of the motor. Therefore, it will result in waste of energy and unnecessary costs.

SUMMARY

In view of the above-mentioned problems of the prior art, the purpose of the present disclosure is to provide an energy-saving wind box, cooling device and an energy-saving cooling system that can adjust the wind area according to the size and the position of the glass, and further can correspondingly regulate the output wind power which corresponds to the rotating speed of the motor.

According to one objective of the present disclosure, the present disclosure provides an energy-saving wind box, comprising: a wind box body, wherein an outer surface of the wind box body has a plurality of air outlets, the air outlets are horizontally arranged in an upper row and a lower row, the air outlets in an upper row are arranged respectively opposite to the air outlets in the lower row, and each of the air outlets has a wind hole; a plurality of slot plates, wherein the slot plates are respectively disposed in the wind holes; and a plurality of driving components, wherein each of the driving components is connected to the corresponding slot plate in the upper row and the corresponding slot plate in the lower row which is arranged opposite to the corresponding slot plate in the upper row, the corresponding two slot plates are controlled by the driving component to pivot to close or open the two corresponding wind holes.

According to the above technical features, the driving component comprises: a base, wherein the base is connected to the outer surface of the wind box body; a cylinder, wherein one end of the cylinder is connected to the base; an adapter, wherein one end of the adapter is connected to another one end of the cylinder, and the other one end of the cylinder is opposite to the end of the cylinder which is connected to the base; a pivot, wherein one end of the pivot is connected to the another one end of the adapter, and the other one end of the adapter is opposite to the end of the adapter which is connected to the cylinder; and a connecting rod, wherein the connecting rod is connected to another one end of the pivot, the other one end of the pivot is opposite to the end of pivot which is connected to the adapter, and two opposite ends of the connecting rod are connected to the corresponding slot plate in the upper row and the corresponding slot plate in the lower row which is arranged opposite to the corresponding slot plate in the upper row.

According to the above technical features, an inner surface of the wind box body has a plurality of through holes arranged horizontally in the lower row and the upper row, the through holes arranged in the lower row are arranged respectively opposite to the through holes arranged in the upper row, and the through holes are respectively connected to the wind holes; wherein energy-saving wind box further comprises: a lifting structure, wherein the lifting structure is disposed on the inner surface of the wind box body; and a shield plate, wherein the shield plate is connected to the lifting structure, the shield plate is controlled by the lifting structure to rise or descend, so as to close the through holes in the upper row or the through holes in the lower row.

According to the above technical features, the lifting structure comprises: two bracket components, wherein the two bracket components are respectively arranged on an upper part and a lower part of the inner surface of the wind box body; and at least one transmission component, wherein the transmission component comprises two transmission gears and a transmission chain, the two transmission gears are respectively disposed on the two bracket components, and the transmission chain surrounds the two transmission gears and is connected to the shield plate.

According to the above technical features, the energy-saving wind box further comprises: a guide frame, wherein the guide frame is disposed on the inner surface of the wind box body and connected to the shield plate, and the shield plate is controlled by the lifting structure to slide on the guide frame.

According to one objective of the present disclosure, the present disclosure provides a cooling device, comprising: a motor; an air blower, wherein the air blower is connected to the motor; a first wind supply pipe, wherein one end of the first wind supply pipe is connected to the air blower; the above energy-saving wind box, wherein a wind inlet of the energy-saving wind box is connected to another one end of the first wind supply pipe, and the other one end of the first wind supply pipe is opposite to the end of the first wind supply pipe which is connected to the air blower; a plurality of second wind supply pipes, wherein one end of each of the second wind supply pipes is connected to the corresponding air outlet of the energy-saving wind box; and a plurality of wind outlet structures, wherein each of the wind outlet structures is connected to another one end of the corresponding second wind supply pipe, the other one end of the corresponding second wind supply pipe is opposite to the end of the corresponding second wind supply pipe which is connected to the energy-saving wind box; wherein the motor adjusts a rotating speed according to a number of the opened wind holes of the energy-saving wind box, so as to control the air blower to generate a corresponding wind power, and then the wind power is output by the wind outlet structure.

According to one objective of the present disclosure, the present disclosure provides an energy-saving cooling system, comprising: a plurality of slot plates, wherein the slot plates are disposed in a wind box body, an outer surface of the wind box body has a plurality of air outlets, the air outlets are horizontally arranged in an upper row and a lower row, the air outlets in an upper row are arranged respectively opposite to the air outlets in the lower row, each of the air outlets has a wind hole, and the slot plates are respectively disposed in the wind holes; a plurality of driving components, wherein each of the driving components is connected to the corresponding slot plate in the upper row and the corresponding slot plate in the lower row which is arranged opposite to the corresponding slot plate in the upper row, the corresponding two slot plates are controlled by the driving component to pivot to close or open the two corresponding wind holes; a controlling device, wherein the controlling device is connected to the driving components and a motor, the controlling device controls the driving components to adjust a rotating speed of the motor according to a control signal; and a detection device, wherein the detection device is connected to the controlling device, the controlling device generates the control signal according to a position and a dimension of a piece of glass to be cooled down, and the position and the dimension of the piece of the glass to be cooled down are detected by the detection device.

According to the above technical features, the driving component comprises: a base, wherein the base is connected to the outer surface of the wind box body; a cylinder, wherein one end of the cylinder is connected to the base; an adapter, wherein one end of the adapter is connected to another one end of the cylinder, and the other one end of the cylinder is opposite to the end of the cylinder which is connected to the base; a pivot, wherein one end of the pivot is connected to the another one end of the adapter, and the other one end of the adapter is opposite to the end of the adapter which is connected to the cylinder; and a connecting rod, wherein the connecting rod is connected to another one end of the pivot, the other one end of the pivot is opposite to the end of pivot which is connected to the adapter, and two opposite ends of the connecting rod are connected to the corresponding slot plate in the upper row and the corresponding slot plate in the lower row which is arranged opposite to the corresponding slot plate in the upper row.

According to the above technical features, an inner surface of the wind box body has a plurality of through holes arranged horizontally in the lower row and the upper row, the through holes arranged in the lower row are arranged respectively opposite to the through holes arranged in the upper row, and the through holes are respectively connected to the wind holes; wherein energy-saving wind box further comprises: a lifting structure, wherein the lifting structure is disposed on the inner surface of the wind box body and connected to the controlling device, and the controlling device controls the lifting structure according to the control signal; and a shield plate, wherein the shield plate is connected to the lifting structure, the shield plate is controlled by the lifting structure to rise or descend, so as to close the through holes in the upper row or the through holes in the lower row.

According to the above technical features, the lifting structure comprises: two bracket components, wherein the two bracket components are respectively arranged on an upper part and a lower part of the inner surface of the wind box body; and at least one transmission component, wherein the transmission component comprises two transmission gears and a transmission chain, the two transmission gears are respectively disposed on the two bracket components, and the transmission chain surrounds the two transmission gears and is connected to the shield plate.

According to the above technical features, the energy-saving cooling system further comprising: a guide frame, wherein the guide frame is disposed on the inner surface of the wind box body and connected to the shield plate, and the shield plate is controlled by the lifting structure to slide on the guide frame.

Based on the above, the present disclosure is mainly based on the arrangement of the slot plates in the wind holes of the outer surface of the wind box body, each slot plate is connected to the corresponding driving component, and the slot plate can be pivoted through the control of the driving component to close or open the corresponding wind hole. Furthermore, the present disclosure can also set a shield plate on the inner surface of the wind box body. The shield plate can be longitudinally displaced under the control of the lifting structure to selectively shield the through holes which are located on the inner surface and communicated with the wind holes. Therefore, the cooling device of the present disclosure can adjust the wind output region according to the size and the position of the glass, and can further adjust the rotating speed of the motor according to the number of opened wind holes of the wind box body, so as to achieve energy saving and cost reduction.

DESCRIPTIONS OF EMBODIMENTS

Embodiments of the present disclosure will now be described, by way of example only, with reference to the accompanying drawings. The following drawings are dedicated for description, and they are schematic and exemplary, being not drawn and precisely allocated in accordance with the actual ratio, thus not limiting the present disclosure.

The energy-saving wind box, cooling device and energy-saving cooling system of the present disclosure can be applied to glass cooling processing technology. When the glass is heated and softened by a heating furnace, the present disclosure can be used to rapidly cool down the glass and make the glass rapidly harden and shrunken, thereby increasing the strength of the glass. Further, the present disclosure can control the wind output range and region according to the size and the position of the glass, avoiding the output of wind to the region where the glass does not exist, so as to save energy and cost.

Figure 1:
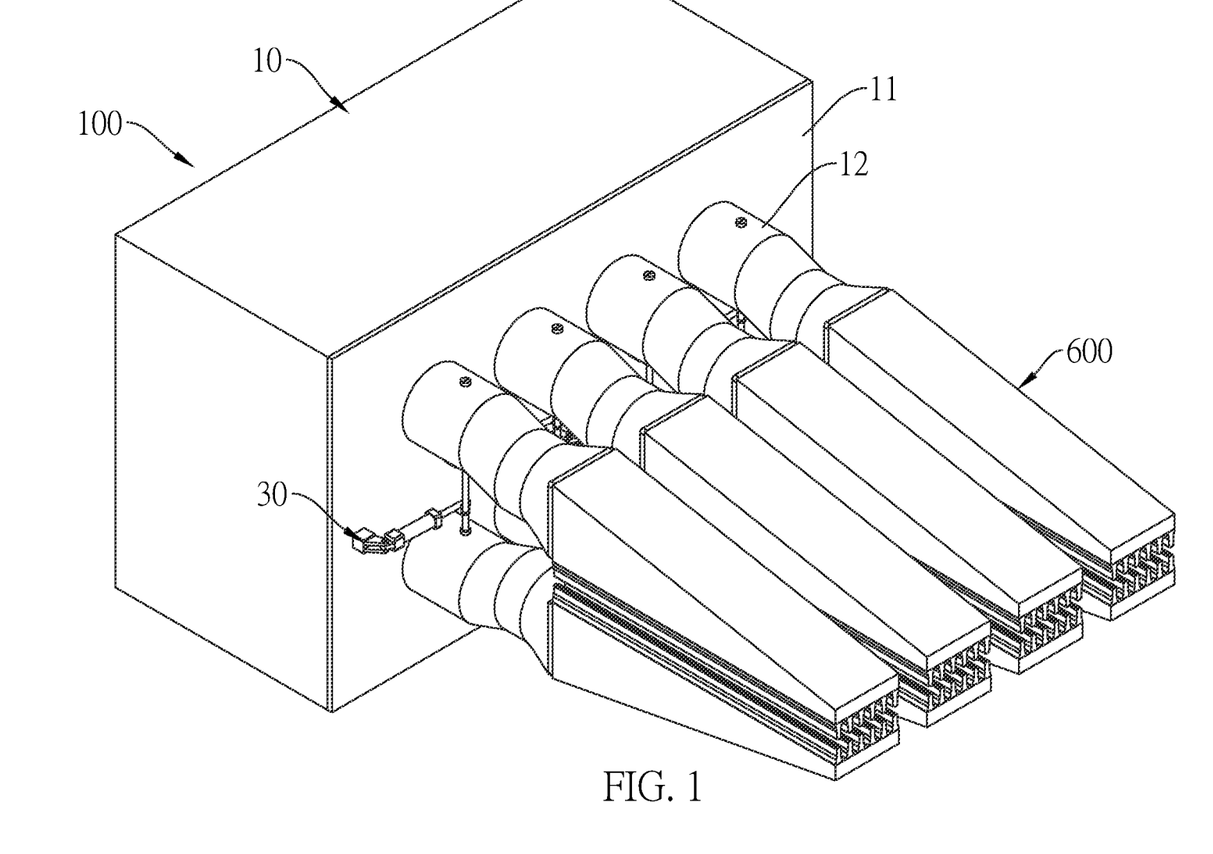
FIG. 1 is a first schematic diagram of an energy-saving wind box according to a first embodiment of the present disclosure.
Figure 2:
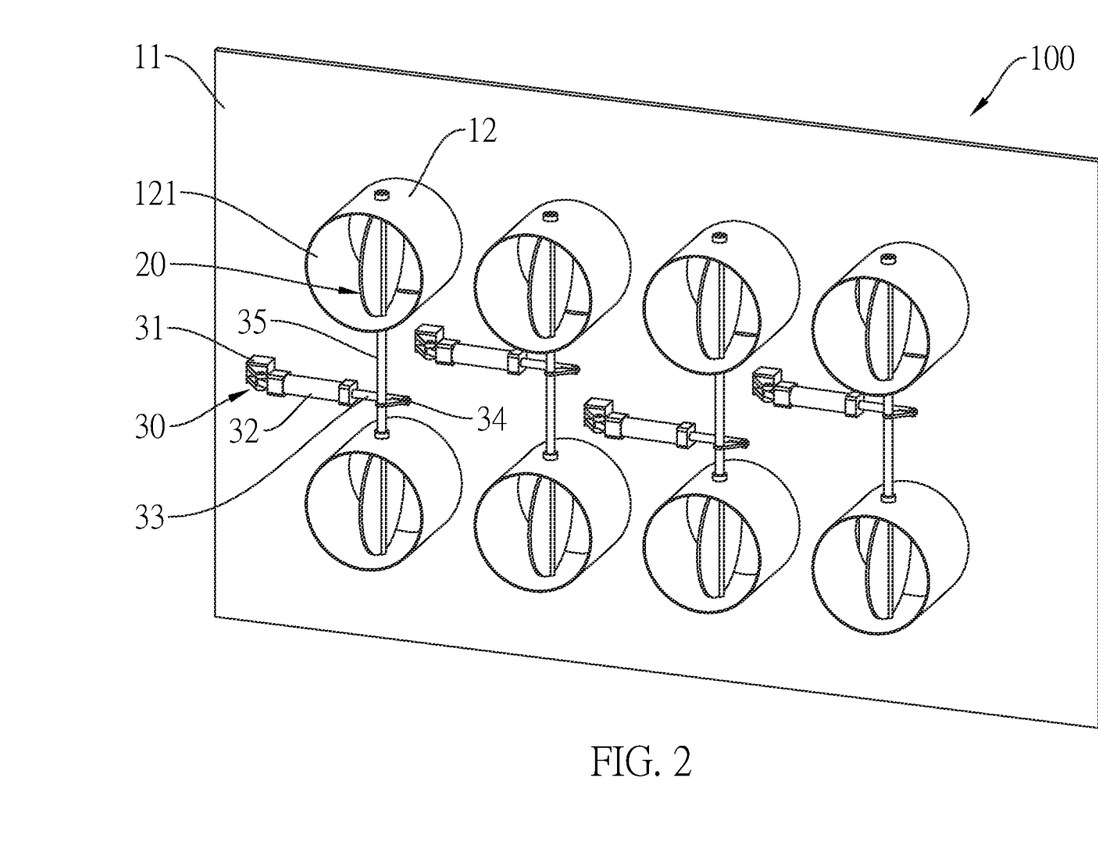
FIG. 2 is a second schematic diagram of an energy-saving wind box according to a first embodiment of the present disclosure.
Figure 3:
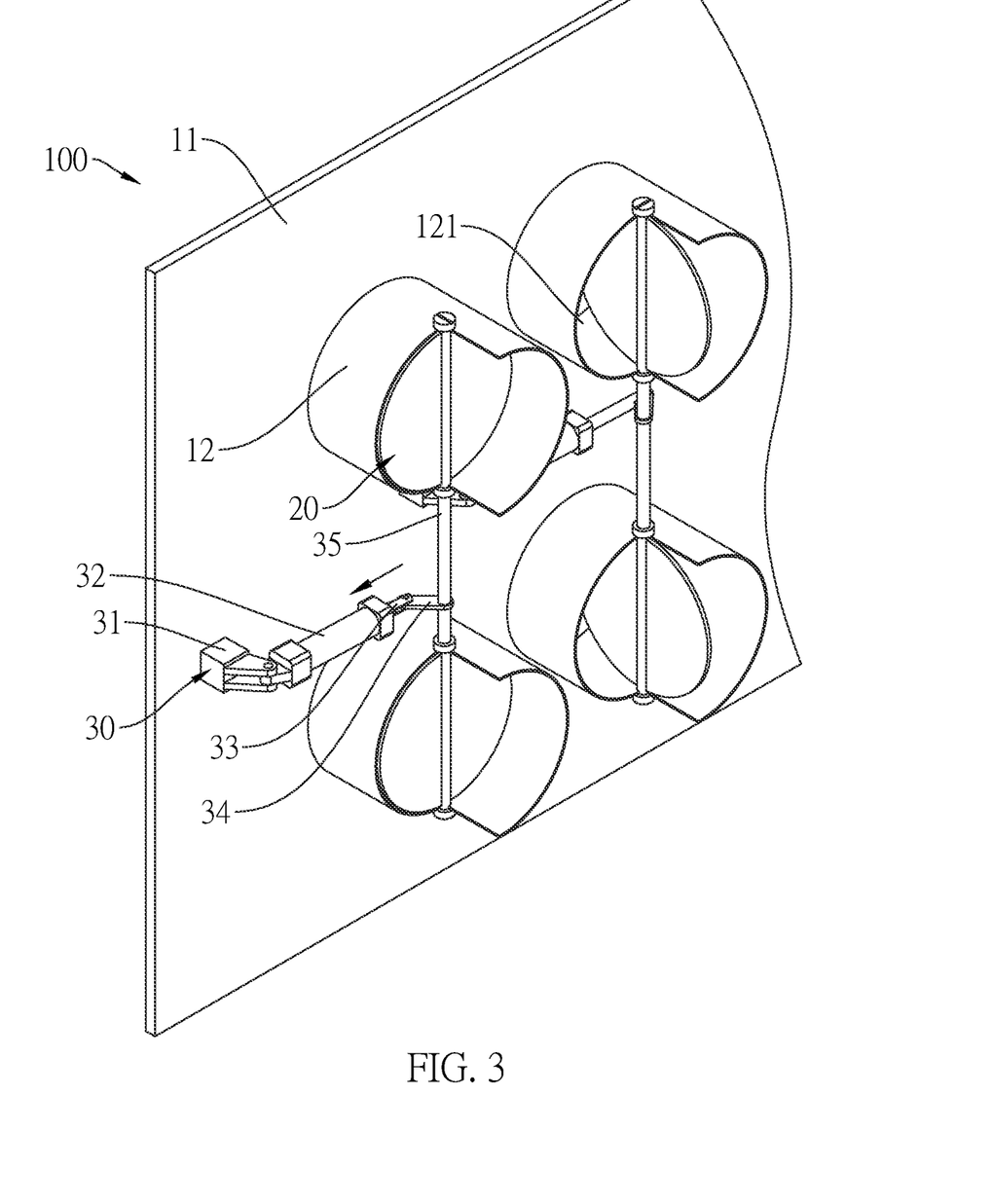
FIG. 3 is a third schematic diagram of an energy-saving wind box according to a first embodiment of the present disclosure.

Refer to FIG. 1 through FIG. 3, and FIG. 1 through FIG. 3 are respectively a first through third schematic diagrams of an energy-saving wind box according to a first embodiment of the present disclosure. As shown in the drawings, the energy-saving wind box 100 mainly comprises a wind box body 10, slot plates 20 and driving components 30. An outer surface 11 of the wind box body 10 has a plurality of air outlets 12. The air outlets 12 are horizontally arranged in an upper row and a lower row on the outer surface 11, the air outlets 12 in an upper row are arranged respectively opposite to the air outlets 12 in the lower row, and each of the air outlets 12 has a wind hole 121. The air outlet 12 is connected to a corresponding one of wind outlet structures 600 directly or indirectly. The wind power flow to the wind outlet structure 600 via the corresponding wind hole 121 of the corresponding air outlet 12. Then through the wind outlet structure 600, the wind power is output to cool down the glass. The main technical feature of the present disclosure is that the slot plates 20 are provided in the wind holes 121 of the air outlets 12, respectively. Each of the driving components 30 is connected to the corresponding slot plate 20 in the upper row and the corresponding slot plate 20 in the lower row which is arranged opposite to the corresponding slot plate 20 in the upper row. The corresponding two slot plates 20 are controlled by the driving component 30 to pivot to close or open the two corresponding wind holes 121. In this way, the corresponding wind hole 121 can be opened according to the size and the position of the glass to be cooled down, so that the wind output region can be controlled.

Figure 4:
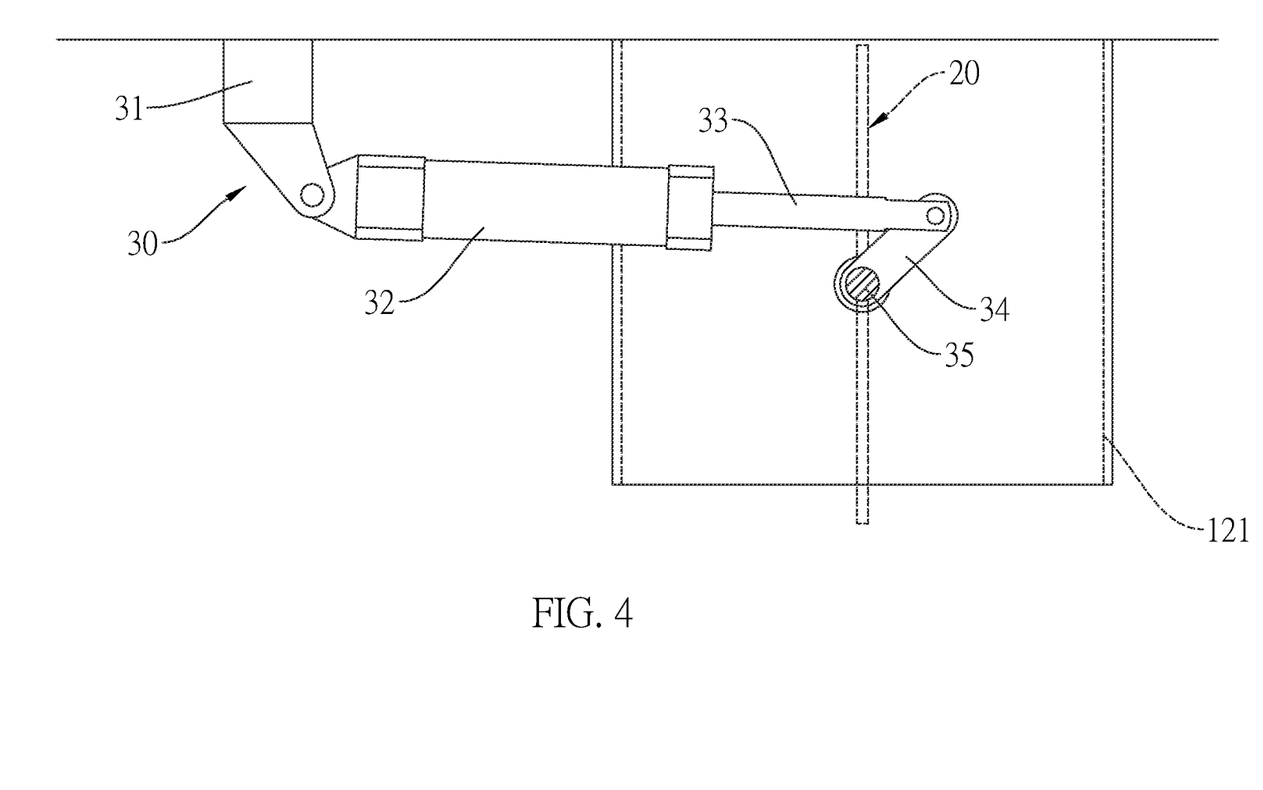
FIG. 4 is a fourth schematic diagram of an energy-saving wind box according to a first embodiment of the present disclosure.
Figure 5:
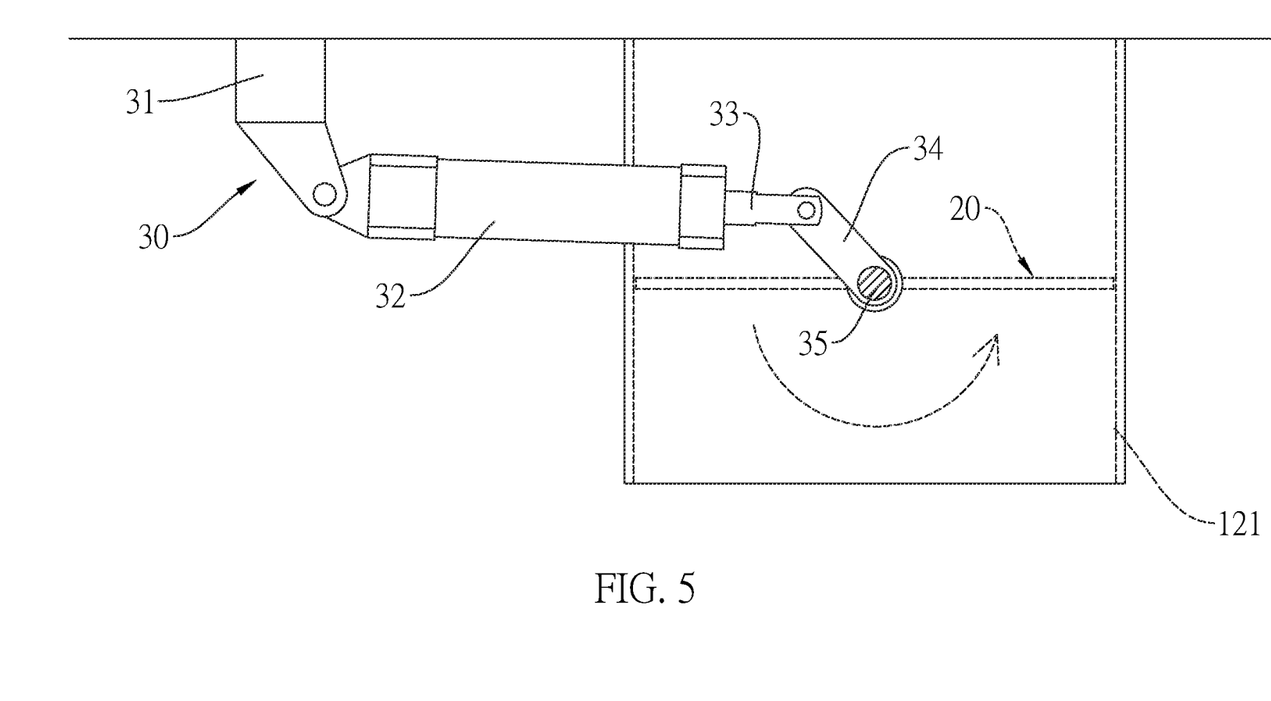
FIG. 5 is a fifth schematic diagram of an energy-saving wind box according to a first embodiment of the present disclosure.

Refer to FIG. 4 and FIG. 5, and FIG. 4 and FIG. 5 are respectively a fourth and fifth schematic diagrams of an energy-saving wind box according to a first embodiment of the present disclosure. Specifically, the driving component 30 comprises a base 31, a cylinder 32, an adapter 33, a pivot 34 and a connecting rod 35. The base 31 is connected to the outer surface 11 of the wind box body 10. One end of the cylinder 32 is connected to the base 31. One end of the adapter 33 is connected to another one end of the cylinder 32, and the other one end of the cylinder 32 is opposite to the end of the cylinder 32 which is connected to the base 31. One end of the pivot 34 is connected to the another one end of the adapter 33, and the other one end of the adapter 33 is opposite to the end of the adapter 33 which is connected to the cylinder 32. The connecting rod 35 is connected to another one end of the pivot 34, the other one end of the pivot 34 is opposite to the end of pivot 34 which is connected to the adapter 33, and two opposite ends of the connecting rod 35 are connected to the corresponding slot plate 20 in the upper row and the corresponding slot plate 20 in the lower row which is arranged opposite to the corresponding slot plate 20 in the upper row. When the cylinder 32 activates, the pivot 34 pivots to drive the connecting rod 35, and the corresponding slot plate 20 in the upper row and the corresponding slot plate 20 in the lower row which is arranged opposite to the corresponding slot plate 20 in the upper row can rotate by the power transmission of the connecting rod 35. When the maximal surface of the slot plate 20 is parallel to the output wind direction of the wind hole 121, the wind hole 121 is opened, as shown in FIG. 2 and FIG. 4. When the maximal surface of the slot plate 20 is vertical to the output wind direction of the wind hole 121, the wind hole 121 is closed as shown in FIG. 3 and FIG. 5.

Figure 6:
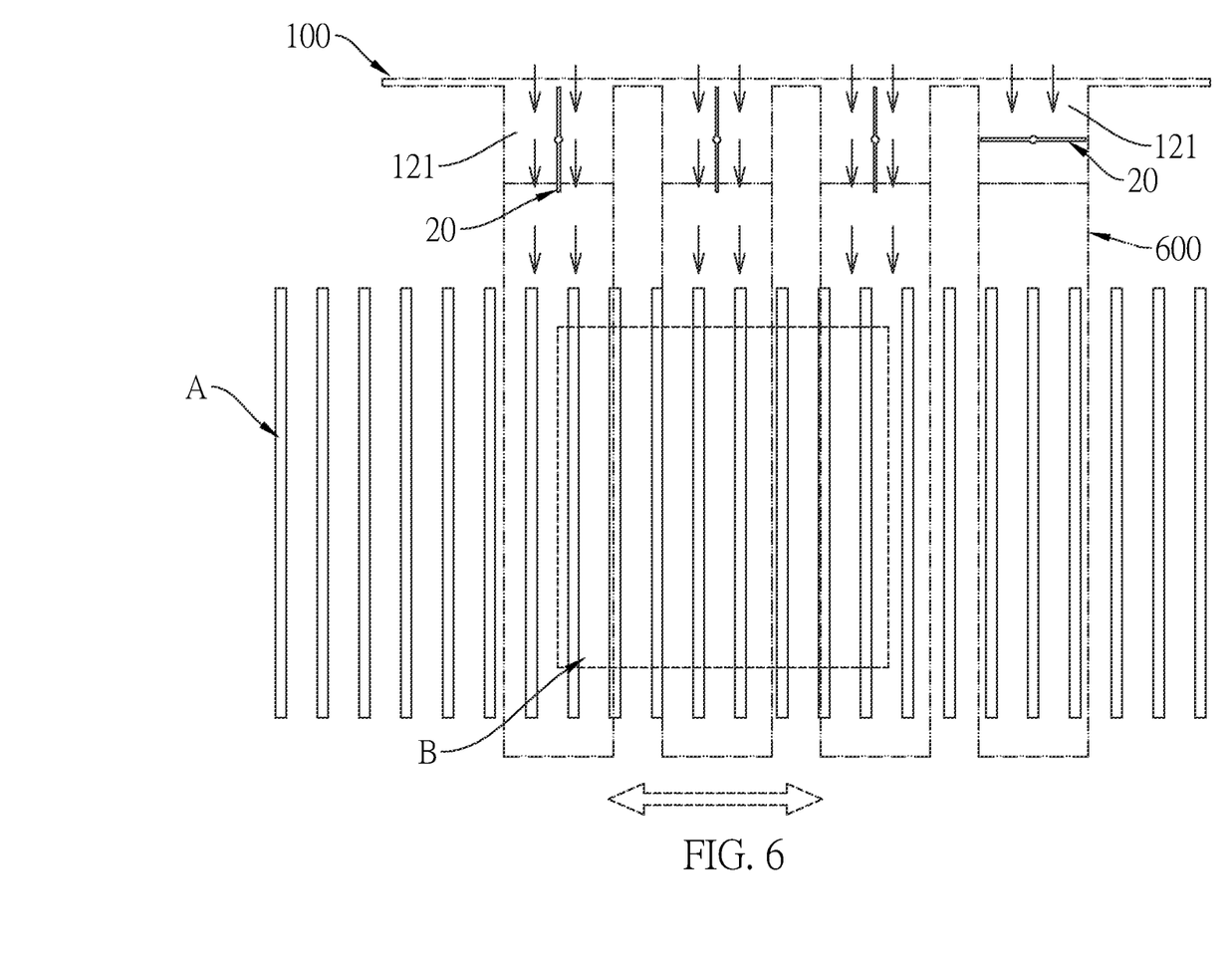
FIG. 6 is a sixth schematic diagram of an energy-saving wind box according to a first embodiment of the present disclosure.

Refer to FIG. 6, and FIG. 6 is a sixth schematic diagram of an energy-saving wind box according to a first embodiment of the present disclosure. As shown in the drawings, in one embodiment, when the size of the glass B to be cooled down on the rollers A is detected by human judgment or the device automatically, the energy-saving wind box 100 of the present disclosure opens the corresponding wind holes 121 according to the dimension and the position of the glass B, and the wind holes which correspond to the non-existence region of the glass B are closed. In this way, only the wind outlet structures 600 which correspond to the position of the glass B output the wind power, so that the cooling operation can be completed with the most energy saving.

Figure 7:
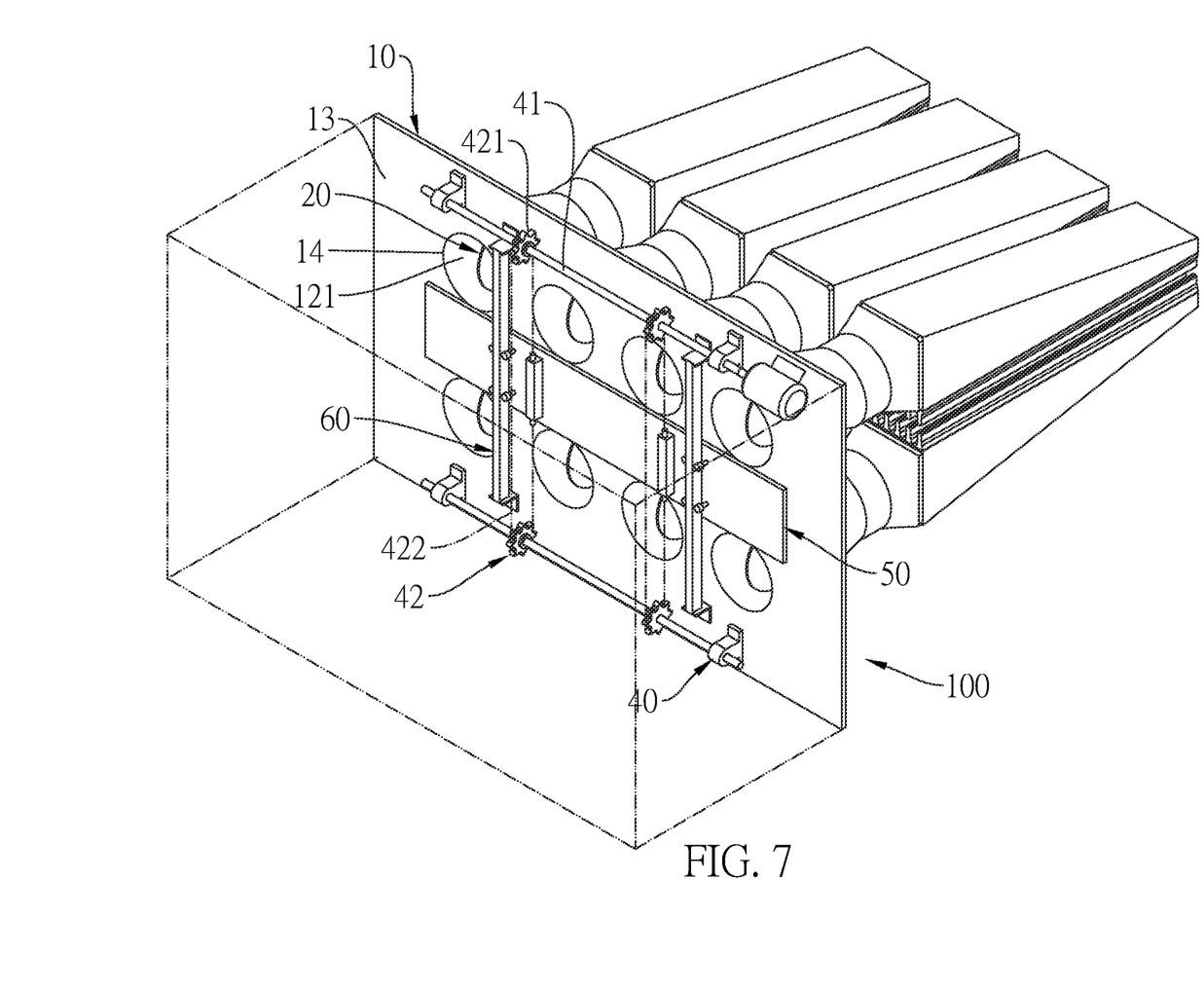
FIG. 7 is a first schematic diagram of an energy-saving wind box according to a second embodiment of the present disclosure.
Figure 8:
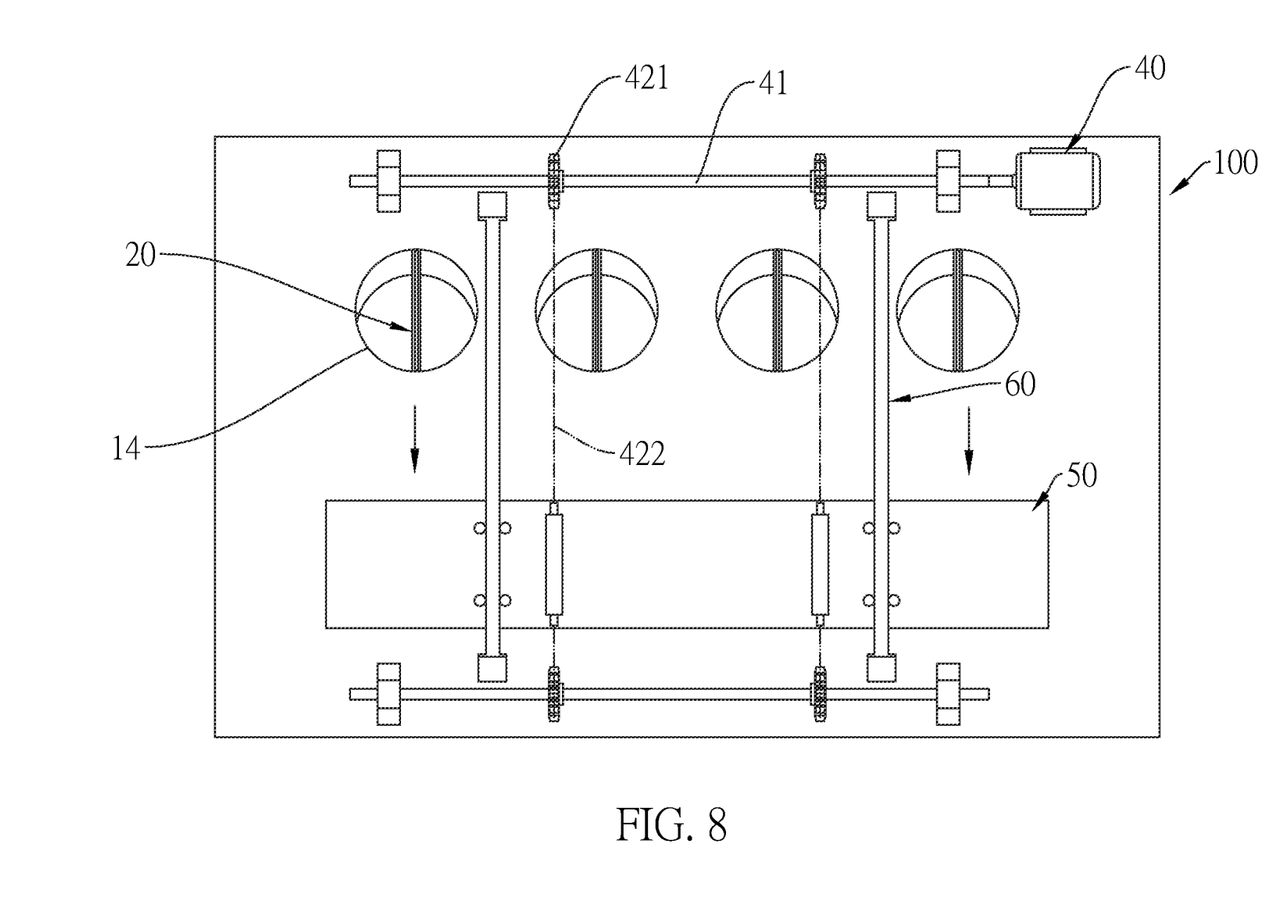
FIG. 8 is a second schematic diagram of an energy-saving wind box according to a second embodiment of the present disclosure.
Figure 9:
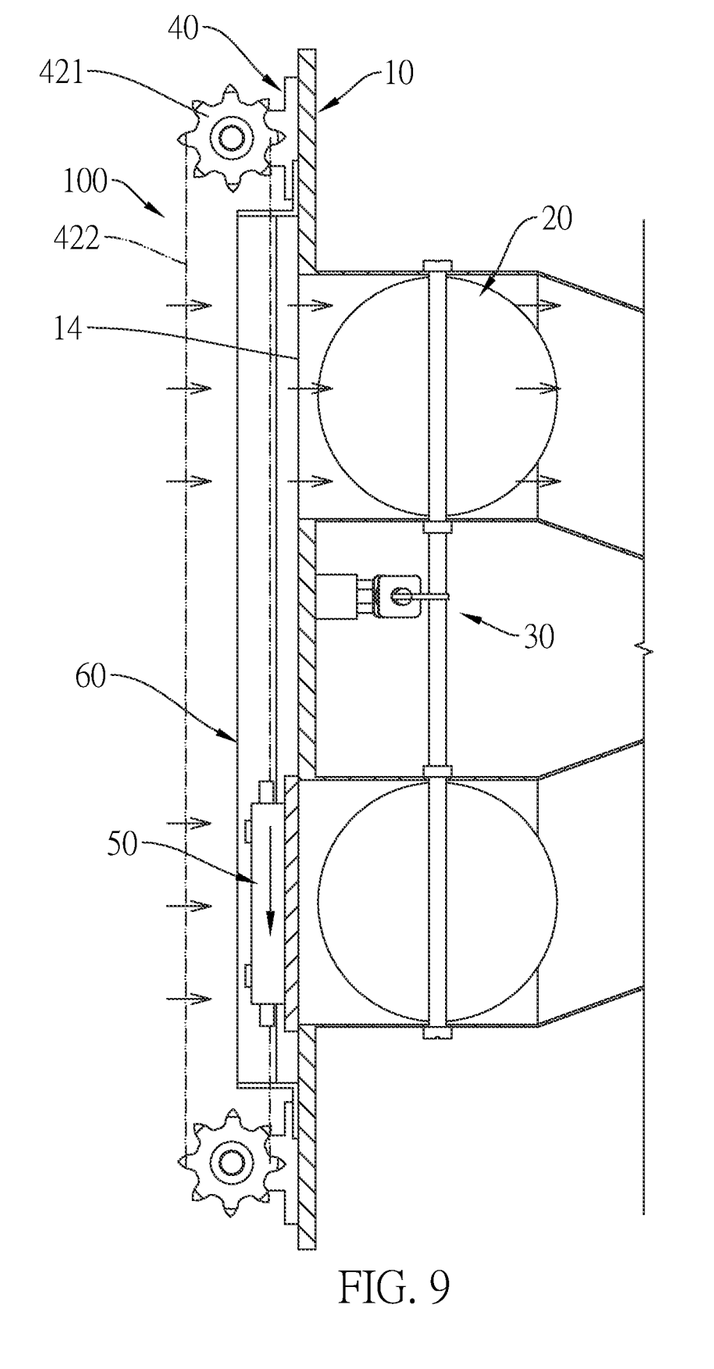
FIG. 9 is a third schematic diagram of an energy-saving wind box according to a second embodiment of the present disclosure.

Refer to FIG. 7 through FIG. 9, and FIG. 7 through FIG. 9 are respectively a first through third schematic diagrams of an energy-saving wind box according to a second embodiment of the present disclosure. The energy-saving wind box 100 in the second embodiment has the components of the energy-saving wind box 100 in the first embodiment, and further comprises a lifting structure 40, a shield plate 50 and at least one guide frame 60. The inner surface 13 of the wind box body 10 has a plurality of through holes 14 arranged horizontally in the lower row and the upper row, the through holes 14 arranged in the lower row are arranged respectively opposite to the through holes 14 arranged in the upper row, and the through holes 14 are respectively connected to the wind holes 121. The lifting structure 40 is disposed on the inner surface 13 of the wind box body 10. The shield plate 50 is connected to the lifting structure 40. The guide frame 60 is disposed on the inner surface 13 of the wind box body 10 and connected to the shield plate 50, and the shield plate 50 is controlled by the lifting structure 40 to slide on the guide frame 60, so that the shield plate can rise or descend. The through holes 14 in the upper row or the lower row can be closed by the shield plate 50 according to the requirements, so that the wind power can only be output from the wind holes 121 in the upper row or the lower row. Further, the guide frame 60 has a position limiting function.

According to the above descriptions, specifically, the lifting structure 40 comprises two bracket components 41 and at least one transmission component 42. The two bracket components 41 are respectively arranged on an upper part and a lower part of the inner surface 13 of the wind box body 10. The transmission component 42 has two transmission gears 421 and a transmission chain 422. The two transmission gears 421 are respectively disposed on the two bracket components 41, and the transmission chain 422 surrounds the two transmission gears 421 and is connected to the shield plate 50. When at least one of the two bracket components 41 rotates, the transmission chain 422 can be driven by the transmission gears 421, and then the longitudinal position of the shield plate 50 can be changed through the transmission chain 422.

Figure 10:
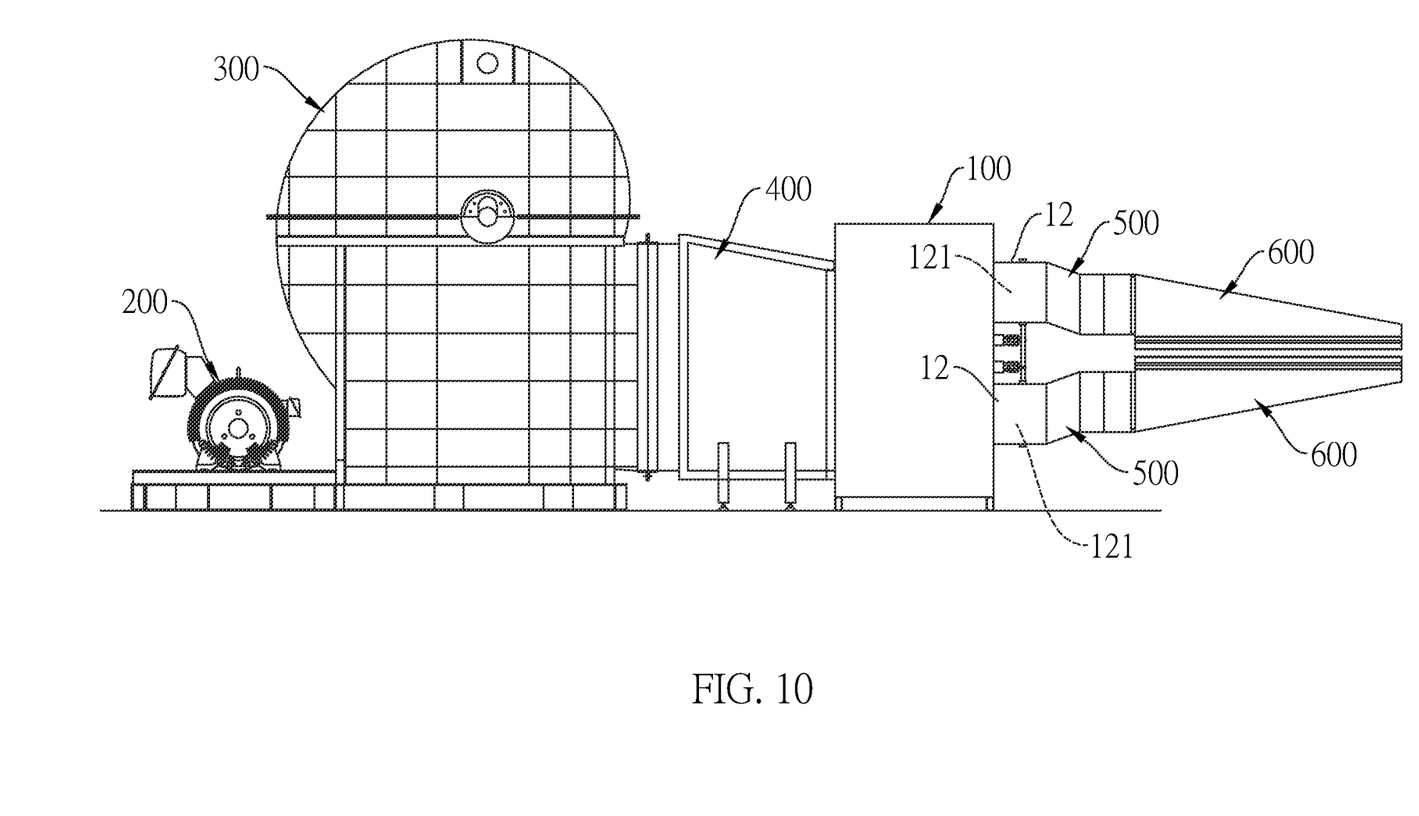
FIG. 10 is a schematic diagram of a cooling device of the present disclosure.

Refer to FIG. 10, and FIG. 10 is a schematic diagram of a cooling device of the present disclosure. As shown in the drawings, the cooling device at least comprises a motor 200, an air blower 300, a first wind supply pipe 400, the energy-saving wind box 100 of the first or second embodiment, second wind supply pipes 500 and wind outlet structures 600. The air blower 300 is connected to the motor 200. One end of the first wind supply pipe 400 is connected to the air blower 300. A wind inlet of the energy-saving wind box 100 is connected to another one end of the first wind supply pipe 400, and the other one end of the first wind supply pipe 400 is opposite to the end of the first wind supply pipe 400 which is connected to the air blower 300. One end of each of the second wind supply pipes 500 is connected to the corresponding air outlet 12 of the energy-saving wind box 100. Each of the wind outlet structures 600 is connected to another one end of the corresponding second wind supply pipe 500, the other one end of the corresponding second wind supply pipe 500 is opposite to the end of the corresponding second wind supply pipe 500 which is connected to the energy-saving wind box 100. The motor 200 adjusts a rotating speed according to a number of the opened wind holes 121 of the energy-saving wind box 100, so as to control the air blower 300 to generate a corresponding wind power, and then the wind power is output by the wind outlet structure 600.

Refer to FIG. 1 through FIG. 11, and FIG. 11 is a schematic diagram of an energy-saving cooling system of the present disclosure. As shown in the drawings, the energy-saving cooling system of the present disclosure at least comprises the slot plates 20, the driving components 30, a controlling device 700 and a detection device 800, or can further comprise the lifting structure 40, the shield plate 50 and the at least one guide frame 60. The slot plates 20 are respectively disposed in the wind holes 121 of the wind box body 10. The driving components 30 is connected to the corresponding slot plate 20 in the upper row and the corresponding slot plate 20 in the lower row which is arranged opposite to the corresponding slot plate 20 in the upper row. The lifting structure 40 and the guide frame 60 are disposed on the wind box body 10 and connected to the shield plate 50. The controlling device 700 is connected to the driving components 30, the lifting structure 40 and the motor 200 of the cooling device. The detection device 800 is connected to the controlling device 700.

Figure 11:
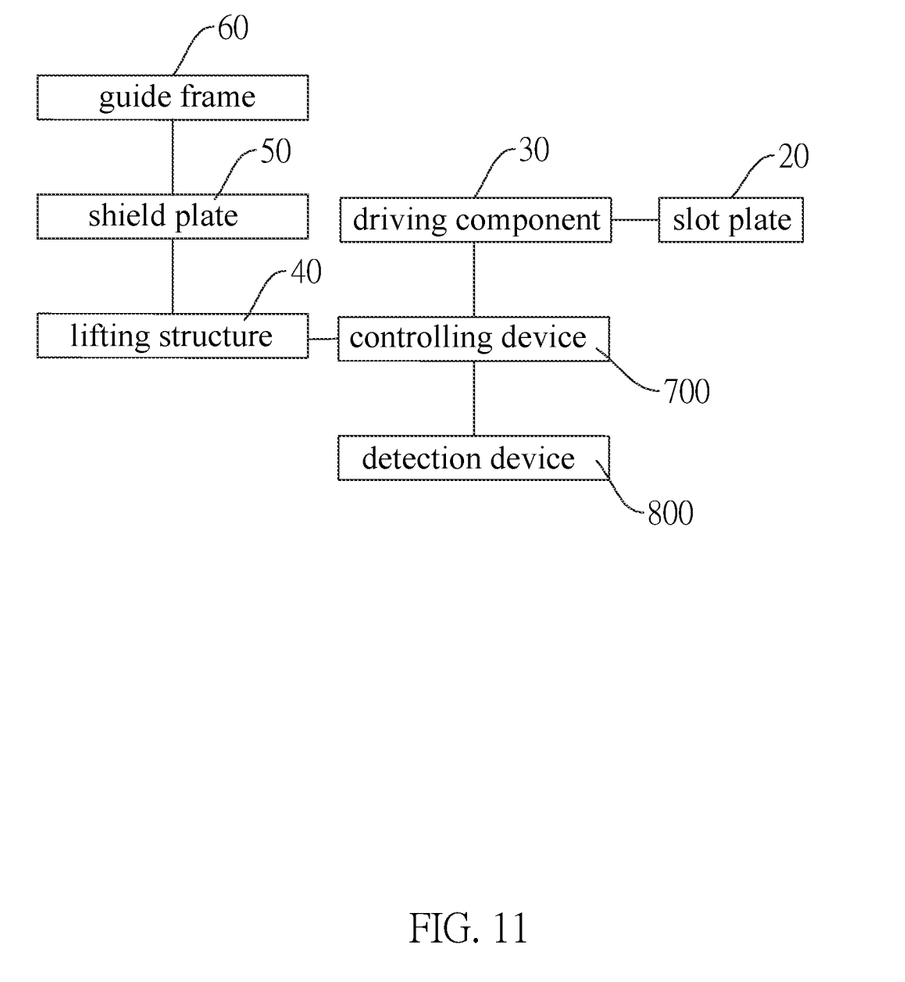
FIG. 11 is a schematic diagram of an energy-saving cooling system of the present disclosure.

The position and the dimension of the piece of the glass to be cooled down are detected by the detection device 800. The controlling device 700 generates the control signal according to a detection result (i.e. the position and the dimension of the piece of the glass) of the detection device 800. The controlling device 700 controls the driving component 30 and the lifting structure 40 according to the control signal, so that the whole wind holes 121 in both of the upper and lower rows or the partial wind holes 121 in the upper and lower rows are opened for the cooling process. The controlling device 700 can adjust the rotation speed of the motor 200 according to the control signal, so that the air blower 300 generates the corresponding wind power, thereby achieving the best energy-saving efficiency.

Specifically, the present disclosure is mainly based on the arrangement of the slot plates in the wind holes of the outer surface of the wind box body, each slot plate is connected to the corresponding driving component, and the slot plate can be pivoted through the control of the driving component to close or open the corresponding wind hole. Furthermore, the present disclosure can also set a shield plate on the inner surface of the wind box body. The shield plate can be longitudinally displaced under the control of the lifting structure to selectively shield the through holes which are located on the inner surface and communicated with the wind holes. Therefore, the cooling device of the present disclosure can adjust the wind output region according to the size and the position of the glass, and can further adjust the rotating speed of the motor according to the number of opened wind holes of the wind box body, so as to achieve energy saving and cost reduction.

The present disclosure is not anticipated by the prior art known by the inventors, and the Applicant believes the present disclosure meets the specifications associated with the provisions of the patent law. Thus, the Applicant submits the application of the present disclosure to respectfully request a substantial examination for obtaining the patent right.

Although particular embodiments of the present disclosure have been described in detail for purposes of illustration, various modifications and enhancements may be made without departing from the spirit and scope of the present disclosure. Accordingly, the present disclosure is not to be limited except as by the appended claims.

What is claimed is:

1. An energy-saving wind box, comprising:
    a wind box body, wherein an outer surface of the wind box body has a plurality of air outlets, the air outlets are horizontally arranged in an upper row and a lower row, the air outlets in an upper row are arranged respectively opposite to the air outlets in the lower row, and each of the air outlets has a wind hole;
    a plurality of slot plates, wherein the slot plates are respectively disposed in the wind holes; and
    a plurality of driving components, wherein each of the driving components is connected to the corresponding slot plate in the upper row and the corresponding slot plate in the lower row which is arranged opposite to the corresponding slot plate in the upper row, the corresponding two slot plates are controlled by the driving component to pivot to close or open the two corresponding wind holes;
    wherein an inner surface of the wind box body has a plurality of through holes arranged horizontally in the lower row and the upper row, the through holes arranged in the lower row are arranged respectively opposite to the through holes arranged in the upper row, and the through holes are respectively connected to the wind holes; wherein energy-saving wind box further comprises:
    a lifting structure, wherein the lifting structure is disposed on the inner surface of the wind box body; and
    a shield plate, wherein the shield plate is connected to the lifting structure, the shield plate is controlled by the lifting structure to rise or descend, so as to close the through holes in the upper row or the through holes in the lower row;

wherein the lifting structure comprises:

two bracket components, wherein the two bracket components are respectively arranged on an upper part and a lower part of the inner surface of the wind box body; and at least one transmission component, wherein the transmission component comprises two transmission gears and a transmission chain, the two transmission gears are respectively disposed on the two bracket components, and the transmission chain surrounds the two transmission gears and is connected to the shield plate.

2. The energy-saving wind box of claim 1, wherein the driving component comprises:

a base, wherein the base is connected to the outer surface of the wind box body;

a cylinder, wherein one end of the cylinder is connected to the base;

an adapter, wherein one end of the adapter is connected to another one end of the cylinder, and the other one end of the cylinder is opposite to the end of the cylinder which is connected to the base;

a pivot, wherein one end of the pivot is connected to the another one end of the adapter, and the other one end of the adapter is opposite to the end of the adapter which is connected to the cylinder; and a connecting rod, wherein the connecting rod is connected to another one end of the pivot, the other one end of the pivot is opposite to the end of pivot which is connected to the adapter, and two opposite ends of the connecting rod are connected to the corresponding slot plate in the upper row and the corresponding slot plate in the lower row which is arranged opposite to the corresponding slot plate in the upper row.

3. The energy-saving wind box of claim 1, further comprising:

a guide frame, wherein the guide frame is disposed on the inner surface of the wind box body and connected to the shield plate, and the shield plate is controlled by the lifting structure to slide on the guide frame.

4. A cooling device, comprising:

a motor;

an air blower, wherein the air blower is connected to the motor;

a first wind supply pipe, wherein one end of the first wind supply pipe is connected to the air blower;

the energy-saving wind box of claim 1, wherein a wind inlet of the energy-saving wind box is connected to another one end of the first wind supply pipe, and the other one end of the first wind supply pipe is opposite to the end of the first wind supply pipe which is connected to the air blower;

a plurality of second wind supply pipes, wherein one end of each of the second wind supply pipes is connected to the corresponding air outlet of the energy-saving wind box; and a plurality of wind outlet structures, wherein each of the wind outlet structures is connected to another one end of the corresponding second wind supply pipe, the other one end of the corresponding second wind supply pipe is opposite to the end of the corresponding second wind supply pipe which is connected to the energy-saving wind box;

wherein the motor adjusts a rotating speed according to a number of the opened wind holes of the energy-saving wind box, so as to control the air blower to generate a corresponding wind power, and then the wind power is output by the wind outlet structure.

5. An energy-saving cooling system, comprising:

a plurality of slot plates, wherein the slot plates are disposed in a wind box body, an outer surface of the wind box body has a plurality of air outlets, the air outlets are horizontally arranged in an upper row and a lower row, the air outlets in an upper row are arranged respectively opposite to the air outlets in the lower row, each of the air outlets has a wind hole, and the slot plates are respectively disposed in the wind holes;

a plurality of driving components, wherein each of the driving components is connected to the corresponding slot plate in the upper row and the corresponding slot plate in the lower row which is arranged opposite to the corresponding slot plate in the upper row, the corresponding two slot plates are controlled by the driving component to pivot to close or open the two corresponding wind holes;

a controlling device, wherein the controlling device is connected to the driving components and a motor, the controlling device controls the driving components and adjusts a rotating speed of the motor according to a control signal; and a detection device, wherein the detection device is connected to the controlling device, the controlling device generates the control signal according to a position and a dimension of a piece of glass to be cooled down, and the position and the dimension of the piece of the glass to be cooled down are detected by the detection device;

wherein an inner surface of the wind box body has a plurality of through holes arranged horizontally in the lower row and the upper row, the through holes arranged in the lower row are arranged respectively opposite to the through holes arranged in the upper row, and the through holes are respectively connected to the wind holes; wherein energy-saving wind box further comprises:

a lifting structure, wherein the lifting structure is disposed on the inner surface of the wind box body and connected to the controlling device, and the controlling device controls the lifting structure according to the control signal; and a shield plate, wherein the shield plate is connected to the lifting structure, the shield plate is controlled by the lifting structure to rise or descend, so as to close the through holes in the upper row or the through holes in the lower row;

wherein the lifting structure comprises:

two bracket components, wherein the two bracket components are respectively arranged on an upper part and a lower part of the inner surface of the wind box body; and at least one transmission component, wherein the transmission component comprises two transmission gears and a transmission chain, the two transmission gears are respectively disposed on the two bracket components, and the transmission chain surrounds the two transmission gears and is connected to the shield plate.

6. The energy-saving cooling system of claim 5, wherein the driving component comprises:

a base, wherein the base is connected to the outer surface of the wind box body;

a cylinder, wherein one end of the cylinder is connected to the base;

an adapter, wherein one end of the adapter is connected to another one end of the cylinder, and the other one end of the cylinder is opposite to the end of the cylinder which is connected to the base;

a pivot, wherein one end of the pivot is connected to the another one end of the adapter, and the other one end of the adapter is opposite to the end of the adapter which is connected to the cylinder; and a connecting rod, wherein the connecting rod is connected to another one end of the pivot, the other one end of the pivot is opposite to the end of pivot which is connected to the adapter, and two opposite ends of the connecting rod are connected to the corresponding slot plate in the upper row and the corresponding slot plate in the lower row which is arranged opposite to the corresponding slot plate in the upper row.

7. The energy-saving cooling system of claim 5, further comprising:

a guide frame, wherein the guide frame is disposed on the inner surface of the wind box body and connected to the shield plate, and the shield plate is controlled by the lifting structure to slide on the guide frame.

\* \* \* \* \*